Patented Aug. 20, 1929.

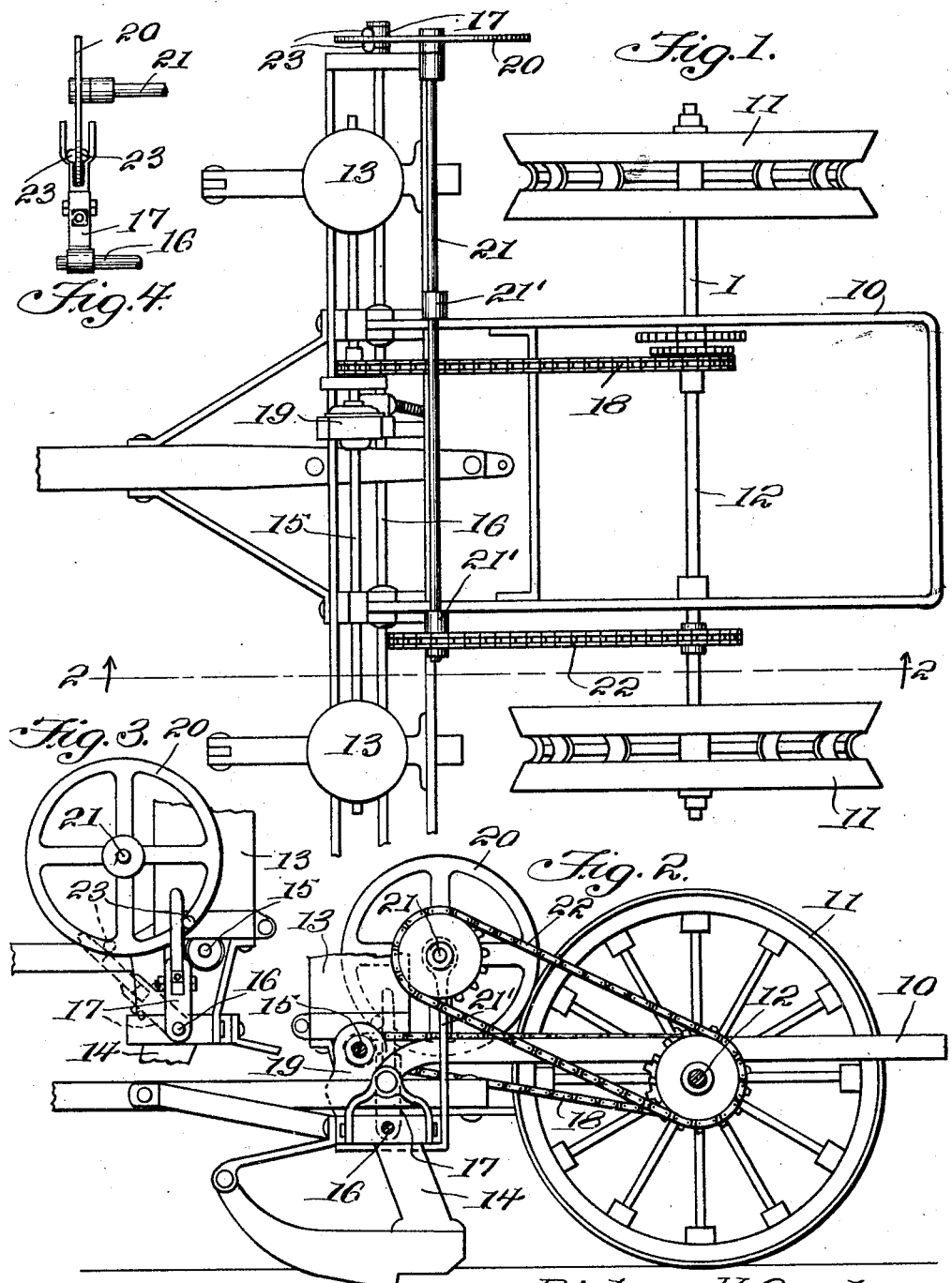

1,725,631

UNITED STATES PATENT OFFICE.

RICHARD H. GOULD, OF CENTERVILLE, MARYLAND, ASSIGNOR OF ONE-HALF TO ANDREW JACKSON JONES, OF CENTERVILLE, MARYLAND.

PLANTER.

Application filed August 6, 1927. Serial No. 211,148.

This invention relates to planters and has especial relation to check row corn planters, an object being to provide means which may be attached to a planter to operate the seed dropping mechanism without the use of the usual wire or chain, and thus eliminate the many disadvantages and details resulting from the use of a wire or chain.

Another object of the invention is the provision of means for accomplishing the above stated object, which are simple in construction, reliable in operation, and which may be attached to a planter primarily intended for using a wire or chain and may be used in substitution for the same.

With the above and other objects in view, the invention further includes the following novel features and details of construction, to be hereinafter more fully described, illustrated in the accompanying drawings and pointed out in the appended claim.

In the drawings:—

Figure 1 is a plan view partly broken away showing a main planter with the invention applied.

Figure 2 is a sectional view on the line 2—2 of Figure 1.

Figure 3 is an enlarged fragmentary elevation.

Figure 4 is a fragmentary elevation taken at right angles to Figure 3.

Referring to the drawings in detail wherein like characters of reference denote corresponding parts, the reference character 10 indicates the frame of the planter which may be of the usual or any preferred construction and which is supported by traction wheels 11 mounted upon the opposite ends of a driving axle 12.

The reference character 13 indicates the hoppers or seed boxes, from which extend the usual boots 14. The dropper shaft which operates the seed dropping mechanism is indicated at 15. This mechanism may be of any preferred type and driven in the usual manner by the operation of the trip shaft 16 which carries an actuating arm 17. The shaft 15 is driven by a sprocket chain 18 from the driving axle 12, while a clutch 19 controls the operation of the shaft 15. All of the foregoing is of the usual or any preferred construction and forms no part of the present invention.

Ordinarily, the actuating arm 17 is operated by a check wire. This method of operation has many disadvantages, among which is the necessity of positioning the wire for the planting of each row. In addition, the wire frequently breaks, or, the wire anchors are pulled up. This interrupts the planting operation and requires considerable additional labor on the part of the operator of the planter. Further, there is the additional expense of the wire and links. All of these disadvantages are overcome in the present invention by the use of a rotatable member or wheel 20 which is secured upon a countershaft 21, mounted in bearings 21' supported by the frame 10. The shaft 21 is driven by a sprocket chain 22 from the driving axle 12. The wheel 20 operates within the bifurcated end of the actuating arm 17 as shown in Figure 4 of the drawings and carries a projection 23 which is adapted to engage the arm 17 so as to rock the shaft 16 and operate the planting mechanism in the usual manner. If desired, more than one projection 23 may be employed and these projections may be arranged so that the interval between the operation of the seed dropping mechanism may be regulated.

The invention is susceptible of various changes in its form, proportions and minor details of construction and the right is herein reserved to make such changes as properly fall within the scope of the appended claim.

Having described the invention what is claimed is:—

In a check row planter, a trip shaft for operating the seed dropping mechanism, a bifurcated actuating arm secured to said shaft, a countershaft mounted in bearings supported by the planter frame, means to drive the countershaft, a member secured to and rotatable with said countershaft and operating within the bifurcation of the actuating arm and means carried by said member to engage the actuating arm and operate the dropping mechanism.

In testimony whereof I affix my signature.

RICHARD H. GOULD.